United States Patent
Yan et al.

(10) Patent No.: US 9,981,187 B2
(45) Date of Patent: May 29, 2018

(54) METHOD AND APPARATUS FOR SIMULATING SOUND IN VIRTUAL SCENARIO, AND TERMINAL

(71) Applicant: TENCENT TECHNOLOGY (SHENZHEN) COMPANY LIMITED, Shenzhen (CN)

(72) Inventors: Yi Yan, Shenzhen (CN); Weilin Zhang, Shenzhen (CN); Wenyong Zhao, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 62 days.

(21) Appl. No.: 15/034,851

(22) PCT Filed: Mar. 6, 2015

(86) PCT No.: PCT/CN2015/073780
§ 371 (c)(1),
(2) Date: May 5, 2016

(87) PCT Pub. No.: WO2015/135443
PCT Pub. Date: Sep. 17, 2015

(65) Prior Publication Data
US 2016/0354693 A1   Dec. 8, 2016

(30) Foreign Application Priority Data
Mar. 12, 2014   (CN) .......................... 2014 1 0090561

(51) Int. Cl.
G06G 7/48   (2006.01)
A63F 13/54   (2014.01)
(Continued)

(52) U.S. Cl.
CPC ............ *A63F 13/54* (2014.09); *A63F 13/573* (2014.09); *A63F 13/577* (2014.09); *G06T 7/20* (2013.01);
(Continued)

(58) Field of Classification Search
CPC ........... A63F 13/54; A63F 13/573; G06T 7/20
(Continued)

(56) References Cited

U.S. PATENT DOCUMENTS 5,754,660 A * 5/1998 Shimizu .................. A63F 13/02
381/17
5,784,467 A * 7/1998 Asayama .................. H04S 3/00
381/17
(Continued)

FOREIGN PATENT DOCUMENTS

CN   101308616 A   11/2008
CN   102651214 A   8/2012
(Continued)

OTHER PUBLICATIONS

Doel et al.("Physically-based Sound Effects for Interactive Simulation and Animation", ACM SIGGRAPH 2001, pp. 537-544).*
(Continued)

*Primary Examiner* — Omar Fernandez Rivas
*Assistant Examiner* — Iftekhar Khan
(74) *Attorney, Agent, or Firm* — Oppedahl Patent Law Firm LLC

(57) ABSTRACT

Embodiments of the present invention provide a method and an apparatus for simulating a sound in a virtual scenario, and a terminal. The method includes: determining whether a virtual object is in a falling state; detecting, when the virtual object is in the falling state, whether a virtual object collides with another virtual object in a virtual scenario; and invoking sound data when the virtual object collides with the
(Continued)

another virtual object, and simulating a sound according to the invoked sound data.

9 Claims, 8 Drawing Sheets

(51) Int. Cl.
| | |
|---|---|
| *G06T 13/00* | (2011.01) |
| *G10K 15/02* | (2006.01) |
| *A63F 13/573* | (2014.01) |
| *A63F 13/577* | (2014.01) |
| *G06T 7/20* | (2017.01) |
| *H04S 7/00* | (2006.01) |

(52) U.S. Cl.
CPC .............. *G06T 13/00* (2013.01); *G10K 15/02* (2013.01); *H04S 7/30* (2013.01); *G06T 2207/30241* (2013.01); *G06T 2210/21* (2013.01)

(58) Field of Classification Search
USPC .............................................................. 703/6
See application file for complete search history.

(56) References Cited

U.S. PATENT DOCUMENTS

| | | | | | |
|---|---|---|---|---|---|
| 6,154,549 | A * | 11/2000 | Arnold | ...................... | H04S 3/00 381/104 |
| 6,496,207 | B1 * | 12/2002 | Matsuda | ............. | G06F 3/04815 715/848 |
| 6,760,050 | B1 * | 7/2004 | Nakagawa | ............... | H04S 1/002 463/33 |
| 6,973,192 | B1 * | 12/2005 | Gerrard | .................... | H04S 7/30 381/17 |
| 7,027,600 | B1 * | 4/2006 | Kaji | ........................ | A63F 13/10 345/419 |
| 7,319,760 | B2 * | 1/2008 | Sekine | ...................... | H04S 7/30 381/17 |
| 9,135,791 | B2 * | 9/2015 | Nakamura | ............... | G06F 3/016 |
| 2003/0045956 | A1 * | 3/2003 | Comair | ................... | A63F 13/10 700/94 |
| 2004/0104912 | A1 * | 6/2004 | Yamamoto | .............. | A63F 13/08 345/473 |
| 2007/0196801 | A1 * | 8/2007 | Nagasaka | ............... | G09B 23/28 434/262 |
| 2007/0239409 | A1 * | 10/2007 | Alan | ................... | G06F 17/5009 703/2 |
| 2010/0162121 | A1 | 6/2010 | Yoakum | | |
| 2010/0261526 | A1 * | 10/2010 | Anderson | ............... | G06F 3/016 463/31 |
| 2011/0199302 | A1 * | 8/2011 | Tossell | .................... | G06F 3/011 345/158 |
| 2012/0219164 | A1 * | 8/2012 | Li | .......................... | G10H 5/007 381/98 |

FOREIGN PATENT DOCUMENTS

| | | |
|---|---|---|
| CN | 104134226 A | 11/2014 |
| JP | H06243229 A | 9/1994 |
| JP | H11272156 A | 10/1999 |
| JP | 2007164291 A | 6/2007 |
| JP | 2007212635 A | 8/2007 |
| JP | 2009205626 | 9/2009 |

OTHER PUBLICATIONS

Funkhouser et al. (Real-Time Acoustic Modeling for Distributed Virtual Environments, 2004, ResearchGate, pp. 1-11).*
O'Brien et al. (Synthesizing Sounds from Rigid-Body Simulations, 2002, ACM, pp. 1-7).*
O'Brien et al. (Synthesizing Sounds from Physically Based Motion, 2001, ACM, pp. 1-8).*
International Search Report in international application No. PCT/CN2015/073780, dated May 27, 2015.
English Translation of the Written Opinion of the International Search Authority in international application No. PCT/CN2015/073780, dated May 27, 2015.
Notification of the First Office Action of Chinese application No. 201410090561.5 , dated Mar. 4, 2015.
<<Geography and Territorial Research>>, Pilot Study on the Virtual Reality City, Xiaoping Rui et al, Aug. 31, 2002.
Notification of the First Office Action of Japanese application No. 2016-539907 , dated Nov. 15, 2016.
Notification of the First Office Action of Korean application No. 10-2016-7014620, dated Jul. 15, 2016.

* cited by examiner

METHOD AND APPARATUS FOR SIMULATING SOUND IN VIRTUAL SCENARIO, AND TERMINAL

CROSS REFERENCE TO RELATED APPLICATIONS

This is a continuation application of International Patent Application No. PCT/CN2015/073780, filed on Mar. 6, 2015, which claims priority to Chinese Patent Application No. 201410090561.5 filed on Mar. 12, 2014, the disclosure of which is incorporated by reference herein in its entirety.

FIELD OF THE TECHNOLOGY

The present invention relates to the field of data processing technologies, and in particular, to a method and an apparatus for simulating a sound in a virtual scenario, and a terminal.

BACKGROUND OF THE DISCLOSURE

Currently, virtual scenario technologies are applied in many aspects. An early virtual scenario technology mainly involves graphic simulation, where the graphic simulation mainly includes simulation of a virtual scenario and simulation of an activity state (such as running or walking) of a virtual object (such as people or an animal) in the virtual scenario, and the graphic simulation mainly refers to processing on image data. With the development of virtual scenario technologies, sound simulation is added based on graphic simulation. In the virtual scenario technologies, one important sound simulation detail is sound simulation when a virtual object in a set null state in a virtual scenario falls onto the ground, that is, a sound is made through sound simulation when the virtual object in a set null state in the virtual scenario falls onto the ground, so as to give a prompt, where a process in which the virtual object in a set null state falls onto the ground corresponds to graphic simulation, and graphic data involved in the process in which the virtual object in a set null state falls onto the ground is processed; a sound made when the virtual object falls onto the ground corresponds to sound simulation, and sound data is processed to implement sound simulation.

In the existing virtual scenario technology, a manner of implementing sound simulation when a virtual object falls onto the ground is: setting a time when a virtual object in a set null state falls onto the ground to be fixed, and when the virtual object starts falling, setting that a falling sound is made after the preset fixed time, thereby implementing sound simulation. In a process of implementing the present invention, the inventor of the present invention finds that: as ragdoll physics is applied in a virtual scenario technology, falling of an virtual object in the ragdoll physics is free falling obtained through computation by an engine, and a time spent by the virtual object in falling onto the ground is determined by the mass, a falling direction, and radian of the virtual object; therefore, a time spent by the virtual object in falling onto the ground is not fixed. As can be seen, in an existing manner in which a time spent by a virtual object in falling onto the ground from a set null state is set to be fixed, so that a falling sound is made after the fixed time, so as to implement sound simulation when the virtual object falls onto the ground, a case in which a sound is simulated before the virtual object falls onto the ground or after a period of time after the virtual object falls onto the ground may possibly occur, so that in the sound simulation process, image data processing may not match sound data processing, that is, currently-processed image data is image data corresponding to a time when the virtual object has already fallen onto the ground, but sound data is not processed yet and sound simulation is not implemented.

SUMMARY

Exemplary aspects of the present invention include a method and an apparatus for simulating a sound in a virtual scenario, and a terminal described below.

A method for simulating a sound in a virtual scenario includes:

determining whether a virtual object is in a falling state;

detecting, when the virtual object is in the falling state, whether the virtual object collides with another virtual object in a virtual scenario; and invoking sound data when the virtual object collides with the another virtual object, and simulating a sound according to the invoked sound data.

An apparatus for simulating a sound in a virtual scenario includes:

a falling determining module, configured to determine whether a virtual object is in a falling state;

a collision detection module, configured to detect, when the virtual object is in the falling state, whether the virtual object collides with another virtual object in a virtual scenario; and a sound simulation module, configured to invoke sound data when the virtual object collides with the another virtual object, and simulate a sound according to the invoked sound data.

A terminal includes the foregoing apparatus for simulating a sound in a virtual scenario.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
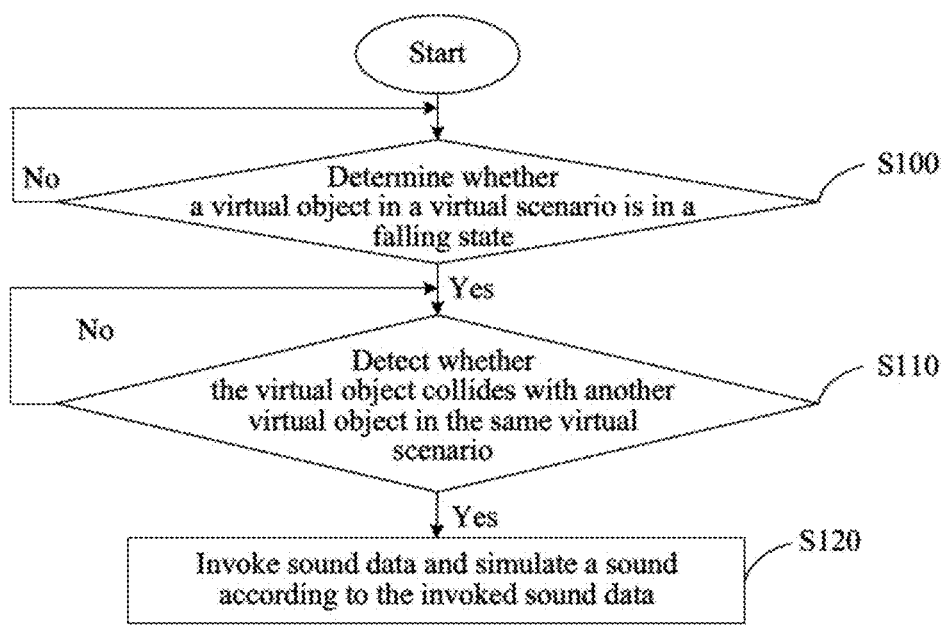
FIG. 1 is a flowchart of a method for simulating a sound in a virtual scenario according to an embodiment of the present invention.

FIG. 1 is a flowchart of a method for simulating a sound in a virtual scenario according to an embodiment of the present invention. Referring to FIG. 1, the method may include:

Step S100: Determine whether a virtual object is in a falling state, and if yes, perform step S110, or if not, perform step S100.

Step S110: Detect whether the virtual object collides with another virtual object in a virtual scenario, and if yes, perform step S120, or if not, perform step S110.

In this embodiment of the present invention, a physical engine may be set to generate a physical shape for a simulated virtual object, where the physical shape of the virtual object includes at least one area, and any area of the physical shape may be any face of the physical shape, or any point of the physical shape.

Optionally, another virtual object may be the ground of the virtual scenario. Obviously, another virtual object may also be any other virtual object in the virtual scenario, such as a desk.

Figure 2:
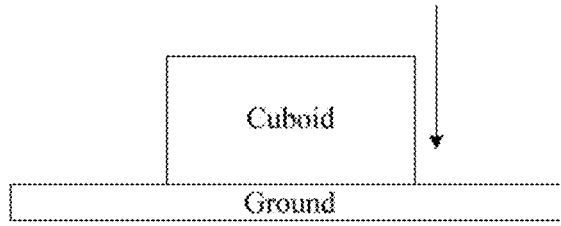
FIG. 2 is a schematic diagram showing that any face of a physical shape of a virtual object collides with any face of a physical shape of another virtual object.

That the virtual object collides with another virtual object may be the following several cases:

Any face of a physical shape of the virtual object collides with any face of a physical shape of the another virtual object; one optional example may be: the shape of the virtual object is a cuboid, the another virtual object is the ground, and when the virtual object falls onto the ground, any face of the cuboid virtual object collides with the ground, as shown in FIG. 2.

Figure 3:
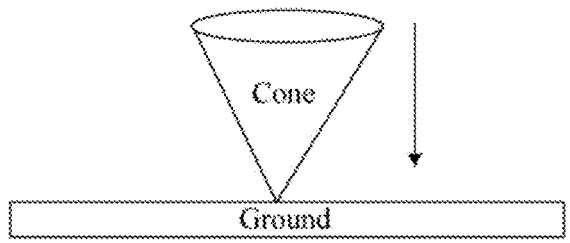
FIG. 3 is a schematic diagram showing that any point of a physical shape of a virtual object collides with any face of a physical shape of another virtual object.

Any point of the physical shape of the virtual object collides with any face of the physical shape of the another virtual object; one optional example may be: the shape of the virtual object is a cone, the another virtual object is the ground, and when the virtual object falls onto the ground, the vertex of the conical virtual object collides with the ground, as shown in FIG. 3.

Figure 4:
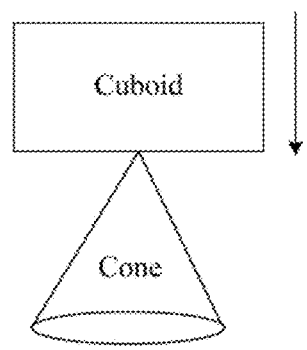
FIG. 4 is a schematic diagram showing that any face of a physical shape of a virtual object collides with any point of a physical shape of another virtual object.

Any face of the physical shape of the virtual object collides with any point of the physical shape of the another virtual object; one optional example may be: the shape of the virtual object is a cuboid, the shape of the another virtual object is a cone, and any face of the cuboid virtual object collides with the vertex of the another conical virtual object, as shown in FIG. 4.

Figure 5:
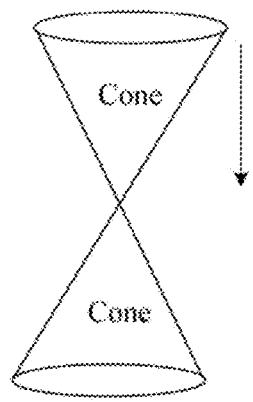
FIG. 5 is a schematic diagram showing that any point of a physical shape of a virtual object collides with any point of a physical shape of another virtual object.

Any point of the physical shape of the virtual object collides with any point of the physical shape of the another virtual object; one optional example may be: the shape of the virtual object is a cone, the shape of the another virtual object also is a cone, and the vertex of the conical virtual object collides with the vertex of the another conical virtual object, as shown in FIG. 5.

Step S120: Invoke sound data and simulate a sound according to the invoked sound data.

In this embodiment of the present invention, sound data may be preset, and when it is detected that the virtual object collides with the another virtual object, the preset sound data is invoked instantly, so as to perform sound simulation according to the invoked sound data.

In the method for simulating a sound in a virtual scenario provided in this embodiment of the present invention, when a virtual object is in a falling state, that the virtual object touches another virtual object in a virtual scenario is determined according to that the virtual object collides with the another virtual object, sound data is invoked and a sound is simulated according to the invoked sound data. This embodiment of the present invention ensures that invocation and simulation of sound data matches currently-processed image data that is image data generated when the virtual object falls onto and collides with the another virtual object, and ensures that in a virtual scenario having ragdoll physics, image data processing when the virtual objects fall and collide matches sound data processing, thereby avoiding advance or lag of sound simulation.

In this embodiment of the present invention, that a failing virtual object collides with another virtual object may be that collision occurs, or that dragging occurs. The following separately introduces a case in which collision occurs and a case in which dragging occurs.

Figure 6:
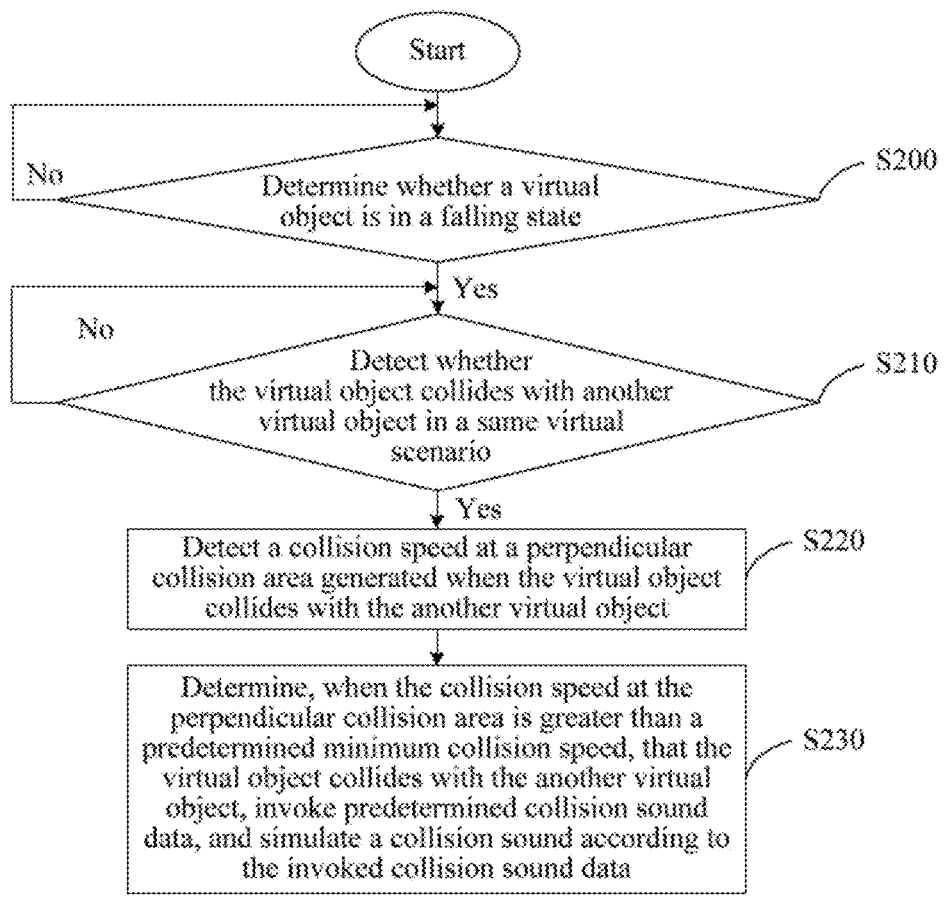
FIG. 6 is another flowchart of a method for simulating a sound in a virtual scenario according to an embodiment of the present invention.

In the case of collision, FIG. 6 shows another flowchart of a method for simulating a sound in a virtual scenario according to an embodiment of the present invention. Referring to FIG. 6, the method may include:

Step S200: Determine whether a virtual object is in a falling state, and if yes, perform step S210, or if not, perform step S200.

Step S210: Detect whether the virtual object collides with another virtual object in a virtual scenario, and if yes, perform step S220, or if not, perform step S210.

Optionally, that the virtual object collides with the another virtual object in the virtual scenario may be that: any face of a physical shape of the virtual object collides with any face of a physical shape of the another virtual object in the virtual scenario, and obviously, may also be another collision manner described above.

Step S220: Detect a collision speed at a perpendicular collision area generated when the virtual object collides with the another virtual object.

Optionally, the collision speed at the perpendicular collision area may be obtained through computation by using a physical engine: the collision speed at the perpendicular collision area=dot (a collision speed, a normal line of a collision area). For example, when the collision area is a plane, the collision speed at the perpendicular collision area is a collision speed at the perpendicular collision plane, and the collision speed at the perpendicular collision plane=dot (a collision speed, and a normal line of a collision plane). The dot is dot product of vectors, and meaning of the formula may be that: a length of a component, perpendicular to the collision area, of the collision speed is taken, where the collision speed may be a vector length of an instant speed generated when the object collides with any other virtual object (for example, the ground).

Step S230: Determine, when the collision speed at the perpendicular collision area is greater than a predetermined minimum collision speed, that the virtual object collides with the another virtual object, invoke predetermined collision sound data, and simulate a collision sound according to the invoked collision sound data.

As can be seen, in this embodiment of the present invention, when the collision speed at the perpendicular collision area generated when the virtual object collides with the another virtual object is greater than the predetermined minimum collision speed, it may be considered that the virtual object collides with the another virtual object.

Optionally, in this embodiment of the present invention, different material properties may be set for the simulated virtual object. Specifically, a correspondence between the simulated virtual object and material information may be preset, and the material information indicates material properties of the simulated virtual object. For example, when the simulated virtual object is a stone, in this embodiment of the present invention, a physical shape of the simulated virtual object may be set to be a shape of a stone, and information indicating a stone material may be configured for the simulated virtual object. In this embodiment of the present invention, one piece of material information corresponds to one material property, and different material properties need to be distinguished by using different material information.

Optionally, in this embodiment of the present invention, a uniform predetermined minimum collision speed may be set for virtual objects having different material properties. Obviously, to make sound simulation more real, virtual objects having different material information may correspond to different predetermined minimum collision speeds, so that when it is determined that the virtual object collides with the another virtual object, different collision sounds are simulated according to different material properties of the virtual objects.

The following table shows an optional schematic relationship between virtual objects having different material properties and predetermined minimum collision speeds provided in this embodiment of the present invention, and reference may be made to this table.

| Material property | Predetermined minimum collision speed (meter/second) |
| --- | --- |
| Large sharp instrument | 0.5 |
| Small sharp instrument | 0.5 |
| Large blunt instrument | 2.5 |
| Small blunt instrument | 2.5 |
| Stone | 2.5 |
| Wood | 0.5 |

Figure 7:
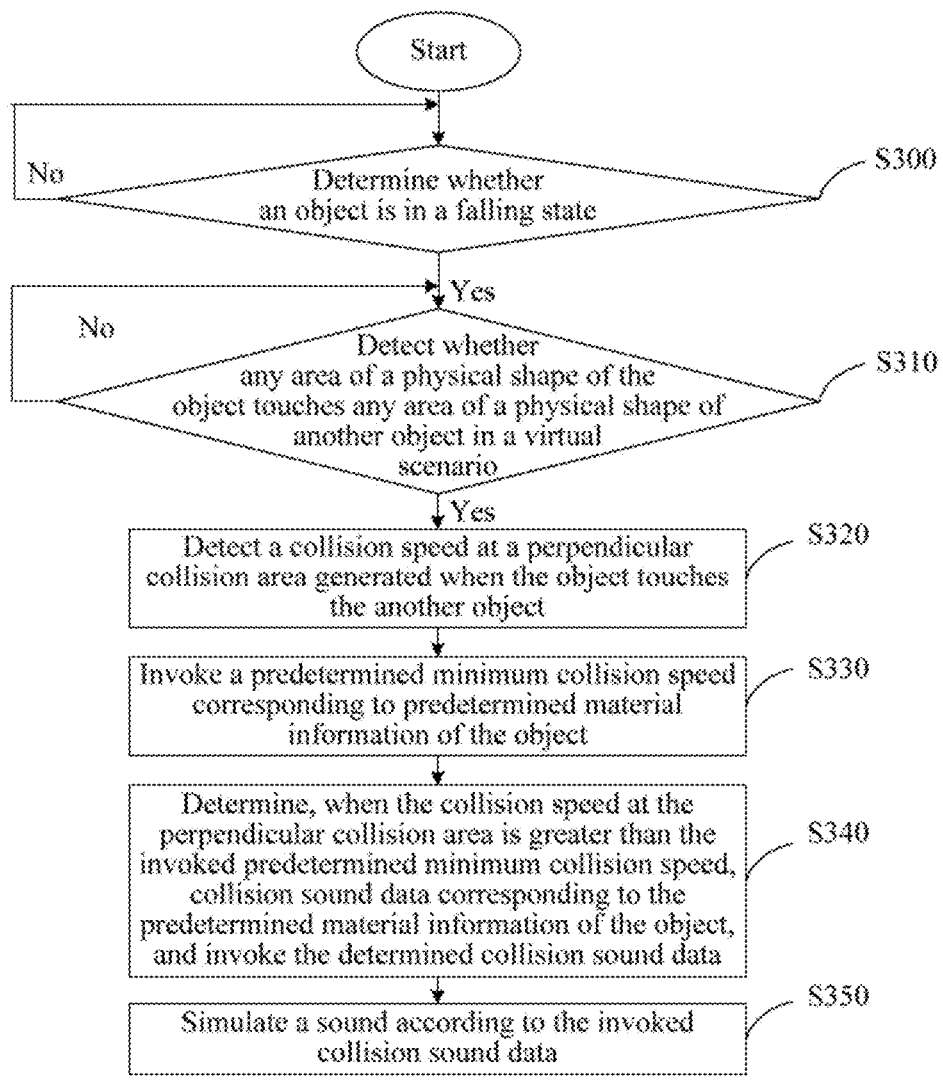
FIG. 7 is still another flowchart of a method for simulating a sound in a virtual scenario according to an embodiment of the present invention.

Correspondingly, FIG. 7 shows still another flowchart of a method for simulating a sound in a virtual scenario according to an embodiment of the present invention. Referring to FIG. 7, the method may include:

Step S300: Determine whether a virtual object is in a falling state, and if yes, perform step S310, or if not, perform step S300.

Step S310: Detect whether the virtual object collides with another virtual object in a virtual scenario, and if yes, perform step S320, or if not, perform step S310.

Step S320: Detect a collision speed at a perpendicular collision area generated when the virtual object collides with the another virtual object.

Step S330: Invoke a predetermined minimum collision speed corresponding to predetermined material information of the virtual object.

Step S340: Determine, when the collision speed at the perpendicular collision area is greater than the invoked predetermined minimum collision speed, collision sound data corresponding to the predetermined material information of the virtual object, and invoke the determined collision sound data.

Step S350: Simulate a collision sound according to the invoked collision sound data.

In the method shown in FIG. 7, a predetermined minimum collision speed corresponds to predetermined material information of a virtual object. In this embodiment of the present invention, after it is determined that the virtual object collides with another virtual object in a virtual scenario, and a collision speed at a perpendicular collision area generated when the virtual object collides with the another virtual object is detected, the predetermined minimum collision speed corresponding to the predetermined material information of the virtual object may be invoked, so as to determine, when the collision speed at the perpendicular collision area is greater than the invoked predetermined minimum collision speed, that a to-be-simulated sound is a collision sound, and the specific collision sound is simulated according to collision sound data corresponding to the predetermined material information of the virtual object. In this embodiment of the present invention, when collision occurs on the virtual object, different collision sounds may be simulated for virtual objects having different material properties, so that the sound simulation is more real and accurate.

Figure 8:
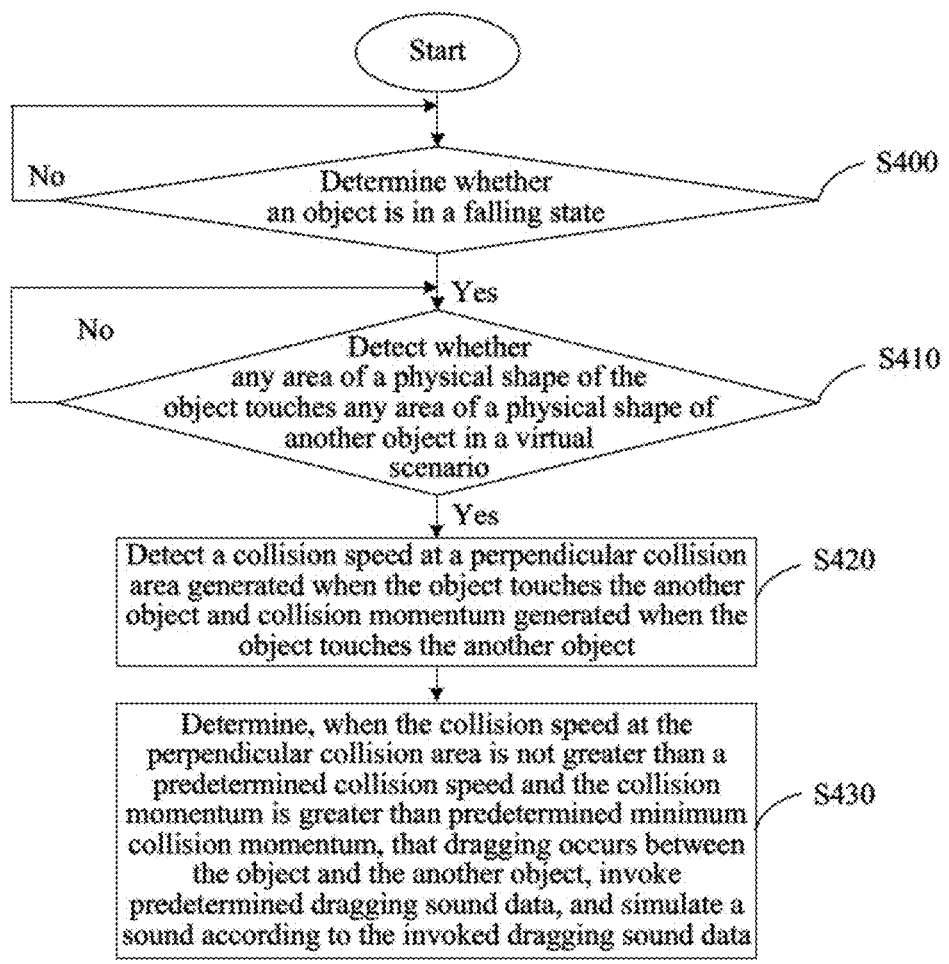
FIG. 8 is yet another flowchart of a method for simulating a sound in a virtual scenario according to an embodiment of the present invention.

In the case of dragging, FIG. 8 shows yet another flowchart of a method for simulating a sound in a virtual scenario according to an embodiment of the present invention. Referring to FIG. 8, the method may include:

Step S400: Determine whether a virtual object is in a falling state, and if yes, perform step S410, or if not, perform step S400.

Step S410: Detect whether the virtual object collides with another virtual object in a virtual scenario, and if yes, perform step S420, or if not, perform step S410.

Optionally, that the virtual object collides with the another virtual object in the virtual scenario may be that: any face of a physical shape of the virtual object collides with any face of a physical shape of the another virtual object in the virtual scenario.

Step S420: Detect a collision speed at a perpendicular collision area generated when the virtual object collides with the another virtual object, and collision momentum generated when the virtual object collides with the another virtual object.

Optionally, for a calculation manner of the collision speed at the perpendicular collision area, reference may be made to the foregoing description, and the collision momentum may be a product of the mass of the object and the collision speed. In this embodiment of the present invention, mass of each virtual object may be preset. Because some unreal effects need to be simulated in the virtual scenario technology, mass of the object is not necessarily set according to a value of mass of the object in the real world, but is determined after testing according to expected simulation effects of the virtual object.

Step S430: Determine, when the collision speed at the perpendicular collision area is not greater than a predetermined collision speed and the collision momentum is greater than a predetermined minimum collision momentum, that dragging occurs between the virtual object and the another virtual object, invoke predetermined dragging sound data, and simulate a dragging sound according to the invoked dragging sound data.

Optionally, the predetermined collision speed may be 1.9 meter/second, and obviously, specific values may be set according to actual application situations. Optionally, in this embodiment of the present invention, uniform predetermined minimum collision momentum may be set for virtual objects having different material properties. Obviously, to make sound simulation more real, virtual objects having different material properties may correspond to different predetermined minimum collision momentum, so that when it is determined that dragging occurs between the virtual object and the another virtual object, different dragging sounds are simulated according to different material properties of the virtual objects.

The following table shows an optional schematic relationship between virtual objects having different material properties and predetermined minimum collision momentum provided in this embodiment of the present invention, and reference may be made to this table.

| Material property | Predetermined minimum collision momentum (kilogram * meter/second) |
| --- | --- |
| Large sharp instrument | 20 |
| Small sharp instrument | 20 |
| Large blunt instrument | 500 |
| Small blunt instrument | 500 |
| Stone | 500 |
| Wood | 110 |

Figure 9:
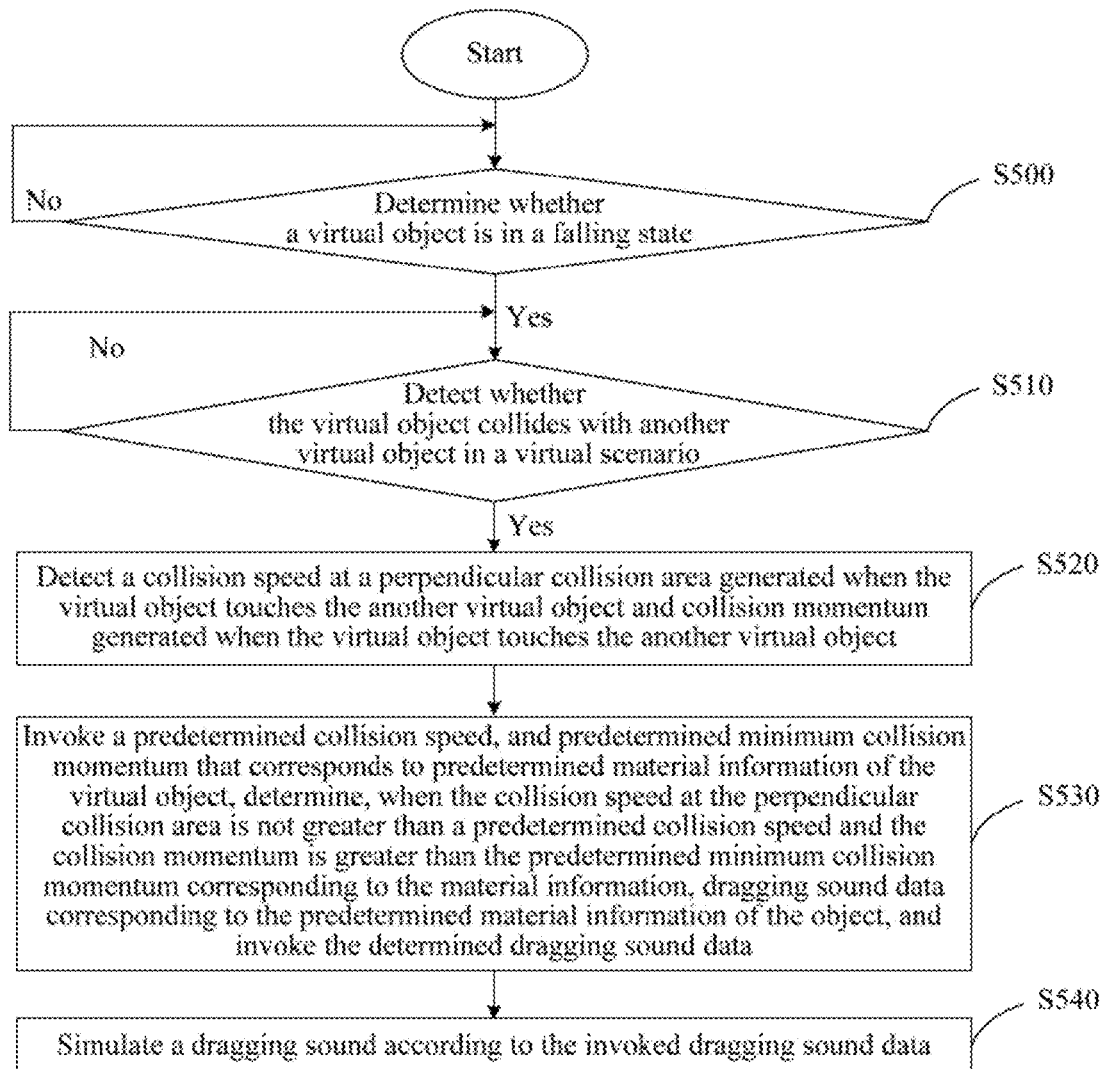
FIG. 9 is still yet another flowchart of a method for simulating a sound in a virtual scenario according to an embodiment of the present invention.

Correspondingly, FIG. 9 shows still yet another flowchart of a method for simulating a sound in a virtual scenario according to an embodiment of the present invention. Referring to FIG. 9, the method may include:

Step S500: Determine whether a virtual object is in a falling state, and if yes, perform step S510, or if not, perform step S500.

Step S510: Detect whether the virtual object collides with another virtual object in a virtual scenario, and if yes, perform step S520, or if not, perform step S510.

Step 520: Detect a collision speed at a perpendicular collision area generated when the virtual object collides with the another virtual object, and collision momentum generated when the virtual object collides with the another virtual object.

Step S530: Invoke a predetermined collision speed, and predetermined minimum collision momentum that corresponds to predetermined material information of the virtual object, and when the collision speed at the perpendicular collision area is not greater than the predetermined collision speed and the collision momentum is greater than the predetermined minimum collision momentum corresponding to the material information, determine dragging sound data corresponding to the predetermined material information of the virtual object, and invoke the determined dragging sound data.

Step S540: Simulate a dragging sound according to the invoked dragging sound data.

In the method shown in FIG. 9, predetermined minimum collision momentum corresponds to predetermined material information of a virtual object. After it is determined that the virtual object collides with another virtual object in the virtual scenario, and a collision speed at a perpendicular collision area generated when the virtual object collides with the another virtual object and collision momentum generated when the virtual object collides with the another virtual object are detected, in this embodiment of the present invention, a predetermined collision speed, and predetermined minimum collision momentum that corresponds to the predetermined material information of the virtual object may be invoked, so as to determine, when the collision speed at the perpendicular collision area is not greater than the predetermined collision speed and the collision momentum is greater than the predetermined minimum collision momentum corresponding to the material information, that a to-be-simulated sound is a dragging sound, and the specific dragging sound is simulated according to dragging sound data corresponding to the predetermined material information of the virtual object. In this embodiment of the present invention, when dragging occurs on the virtual object, different dragging sounds may be simulated for virtual objects having different material properties, so that the sound simulation is more real and accurate.

Optionally, the method for simulating a sound in a virtual scenario provided in this embodiment of the present invention may be applied in sound simulation during falling of a virtual object in a crime scene of a criminal case, so as to help case scene restoration and case investigation. Obviously, the method for simulating a sound in a virtual scenario provided in this embodiment of the present invention may also be applied in the game field having the ragdoll physics; a physical shape may be generated for equipment by using a physical engine, after a role in a game is killed, and the held equipment fell, whether the equipment collides with the ground may be detected, and when it is detected that the falling equipment collides with the ground, sound data may be invoked, and a sound is simulated according to the invoked sound data, thereby implementing matching between image data processing when the equipment in the game falls onto the ground and sound data processing when the equipment falls onto the ground and makes a sound.

The following describes an apparatus for simulating a sound in a virtual scenario provided in an embodiment of the present invention, and mutual reference may be made to the apparatus for simulating a sound in a virtual scenario and the method for simulating a sound in a virtual scenario described above.

Figure 10:
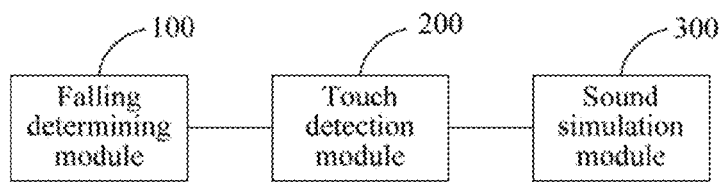
FIG. 10 is a structural block diagram of an apparatus for simulating a sound in a virtual scenario according to an embodiment of the present invention.

FIG. 10 is a structural block diagram of an apparatus for simulating a sound in a virtual scenario according to an embodiment of the present invention. Referring to FIG. 10, the apparatus for simulating a sound in a virtual scenario may include:

A falling determining module 100 is configured to determine whether a virtual object is in a falling state.

A collision detection module 200 is configured to detect, when the virtual object is in the falling state, whether the virtual object collides with another virtual object in a virtual scenario.

Optionally, any face of a physical shape of the virtual object may collide with any face of a physical shape of the another virtual object; or, any point of a physical shape of the virtual object may collide with any face of a physical shape of the another virtual object; or, any face of a physical shape of the virtual object may collide with any point of a physical shape of the another virtual object; or, any point of a physical shape of the virtual object may collide with any point of a physical shape of the another virtual object.

A sound simulation module 300 is configured to invoke sound data when the virtual object collides with any area of the another virtual object, and simulate a sound according to the invoked sound data.

In the apparatus for simulating a sound in a virtual scenario provided in this embodiment of the present invention, when a virtual object is in a falling state, that the virtual object touches another virtual object in a virtual scenario is determined according to that the virtual object collides with the another virtual object, sound data is invoked and a sound is simulated according to the invoked sound data. This embodiment of the present invention ensures that invocation and simulation of sound data matches currently-processed image data that is image data generated when the virtual object falls onto and collides with the another virtual object, and ensures that in a virtual scenario having ragdoll physics, image data processing when the virtual objects fall and collide matches sound data processing, thereby avoiding advance or lag of sound simulation.

Figure 11:
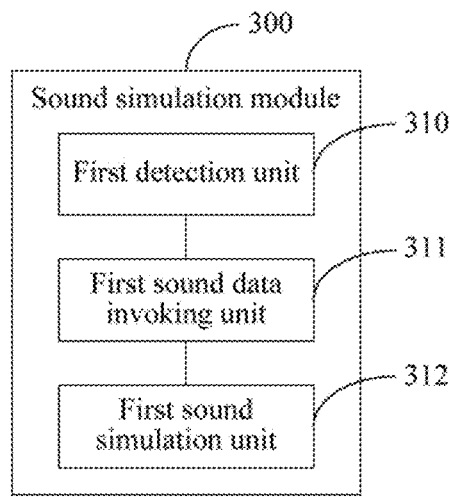
FIG. 11 is a structural block diagram of a sound simulation module according to an embodiment of the present invention.

Optionally, that the falling virtual object collides with another virtual object may be that collision occurs. Correspondingly, FIG. 11 shows an optional structure of the sound simulation module 300, and referring to FIG. 11, the sound simulation module 300 may include:

a first detection unit 310, configured to detect, when the virtual object collides with the another virtual object, a collision speed at a perpendicular collision area generated when the virtual object collides with the another virtual object;

a first sound data invoking unit 311, configured to invoke predetermined collision sound data when the collision speed at the perpendicular collision area is greater than a predetermined minimum collision speed; and a first sound simulation unit 312, configured to simulate a collision sound according to the invoked collision sound data.

Figure 12:
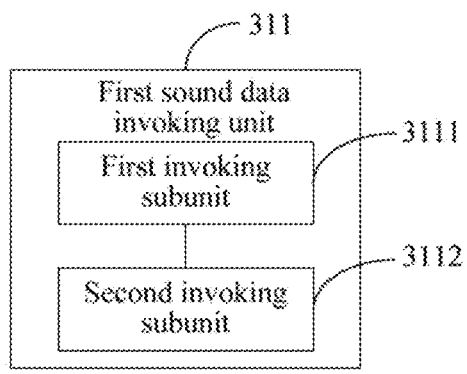
FIG. 12 is a structural block diagram of a first sound data invoking unit according to an embodiment of the present invention.

Optionally, the predetermined minimum collision speed may correspond to predetermined material information of the virtual object. Correspondingly, FIG. 12 shows an optional structure of the first sound data invoking unit 311, and referring to FIG. 12, the first sound data invoking unit 311 may include:

a first invoking subunit 3111, configured to invoke the predetermined minimum collision speed corresponding to the predetermined material information of the virtual object; and a second invoking subunit 3112, configured to determine, when the collision speed at the perpendicular collision area is greater than the predetermined minimum collision speed corresponding to the material information, collision sound data corresponding to the predetermined material information of the virtual object, and invoke the determined collision sound data.

Figure 13:
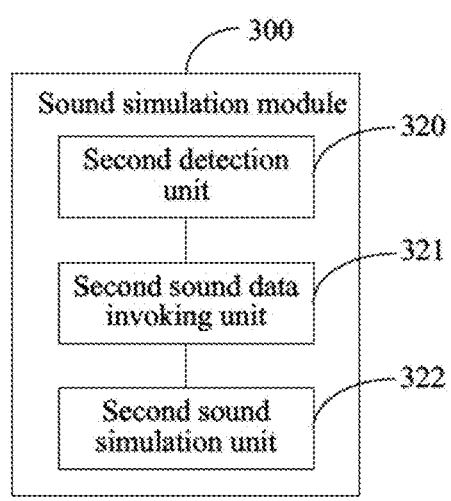
FIG. 13 is another structural block diagram of a sound simulation module according to an embodiment of the present invention.

Optionally, that the falling virtual object collides with another virtual object may be that dragging occurs. Correspondingly, FIG. 13 shows another optional structure of the sound simulation module 300, and referring to FIG. 13, the sound simulation module 300 may include:

a second detection unit 320, configured to detect, when the virtual object collides with the another virtual object, a collision speed at a perpendicular collision area generated when the virtual object collides with the another virtual object and collision momentum generated when the virtual object collides with the another virtual object;

a second sound data invoking unit 321, configured to invoke predetermined dragging sound data if the collision speed at the perpendicular collision area is not greater than a predetermined collision speed and the collision momentum is greater than predetermined minimum collision momentum; and a second sound simulation unit 322, configured to simulate a dragging sound according to the invoked dragging sound data.

Figure 14:
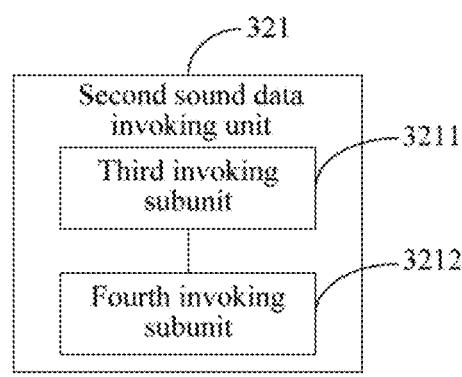
FIG. 14 is a structural block diagram of a second sound data invoking unit according to an embodiment of the present invention.

Optionally, the predetermined minimum collision momentum may correspond to the predetermined material information of the virtual object. Correspondingly, FIG. 14 shows an optional structure of the second sound data invoking unit 321, and referring to FIG. 14, the second sound data invoking unit 321 may include:

a third invoking subunit 3211, configured to invoke the predetermined collision speed, and the predetermined minimum collision momentum that corresponds to the predetermined material information of the virtual object; and a fourth invoking subunit 3212, configured to determine, when the collision speed at the perpendicular collision area is not greater than the predetermined collision speed and the collision momentum is greater than the predetermined minimum collision momentum corresponding to the material information, dragging sound data corresponding to the predetermined material information of the virtual object, and invoke the determined dragging sound data.

The apparatus for simulating a sound in a virtual scenario provided in this embodiment of the present invention may be applied in sound simulation during falling of a virtual object in a crime scene of a criminal case, so as to help case scene restoration and case investigation; and the apparatus for simulating a sound in a virtual scenario provided in this embodiment of the present invention may also be applied in the game field having the ragdoll physics, so as to implement matching between image data processing when equipment in a game falls onto the ground and sound data processing when the equipment falls onto the ground and makes a sound.

An embodiment of the present invention further provides a terminal. As used herein, the terminal may refer to any appropriate user terminal with certain computing capabilities (for example, can perform virtual scenario simulation), such as a personal computer (PC), a work station computer, a hand-held computing device (tablet), a mobile terminal (a mobile phone or a smart phone), a smart terminal, or any other user-side computing device. The terminal may include the apparatus for simulating a sound in a virtual scenario described above. For descriptions about the apparatus for simulating a sound in a virtual scenario, reference may be made to corresponding parts above, and no further details are provided herein again.

Figure 15:
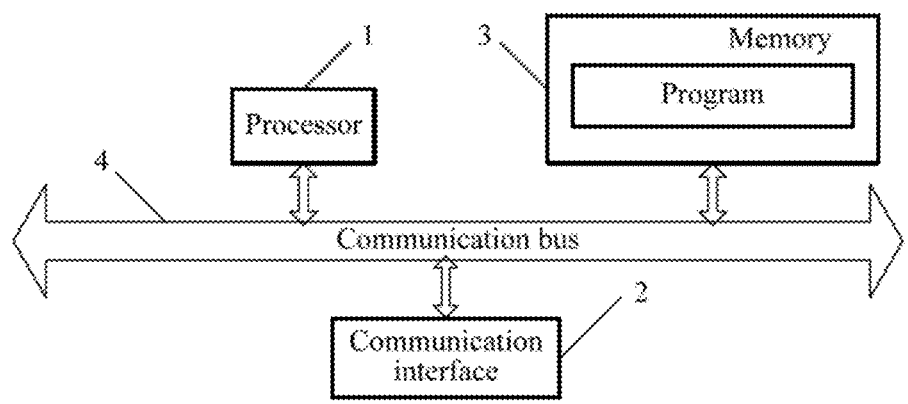
FIG. 15 is a structural diagram of a terminal according to an embodiment of the present invention.

The following describes a hardware structure of the terminal provided in this embodiment of the present invention. FIG. 15 shows a hardware structure of the terminal. Referring to FIG. 15, the terminal may include a processor 1, a communication interface 2, a memory 3, and a communication bus 4.

The processor 1, the communication interface 2, and the memory 3 implement communication between each other through the communication bus 4.

Optionally, the communication interface 2 may be an interface of a communications module, such as an interface of a GSM module.

The processor 1 is configured to execute a program.

The memory 3 is configured to store a program.

The program may include program code, where the program code includes a computer operation instruction.

The processor 1 may be a central processing unit CPU, or an application specific integrated circuit (ASIC), or one or more integrated circuits configured to implement the embodiments of the present invention.

The memory 3 may include a high-speed RAM memory, and may further include a non-volatile memory, for example, at least one disk memory.

The program may be specifically used for:

determining whether a virtual object is in a falling state;

detecting, when the virtual object is in the falling state, whether the virtual object collides with another virtual object in a virtual scenario; and invoking sound data when the virtual object collides with the another virtual object, and simulating a sound according to the invoked sound data.

The embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

A person skilled in the art may realize that combining with the units and algorithm steps of examples described in the embodiments disclosed in this specification, the methods and the units can be accomplished by electronic hardware, computer software or both. In order to describe the interchangeability of the hardware and the software clearly, the composition and steps of each embodiment are described generally in the above description according to the function. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The steps of the method or algorithm combined with the description of the embodiments disclosed in this specification may be performed directly by hardware, a software module executed by a processor, or the combination of the two. The software module may be set in a random access memory (RAM), a memory, a read-only memory, an electrically programmable ROM, an electrically erasable and programmable ROM, a register, a hard disk, a removable hard disk, a CD-ROM, or any storage medium in other forms well-known in the technical field.

For the foregoing descriptions of the disclosed embodiments, a person skilled in the art can implement or use the present invention. Various modifications of the embodiments are apparent to a person of ordinary skill in the art, and general principles defined in this specification may be implemented in other embodiments without departing from the spirit or scope of the present invention. Therefore, the present invention will not be limited to the embodiments described in this specification but extends to the widest scope that complies with the principle and novelty disclosed in this specification.

What is claimed is:

1. A method for simulating a sound in a virtual scenario, comprising:

at a terminal having one or more processors, and a memory storing programs executed by the one or more processors:

determining whether a virtual object in a virtual scenario is in a falling state;

detecting, when the virtual object is in the falling state, whether the virtual object collides with another virtual object in the virtual scenario;

invoking sound data when the virtual object collides with the another virtual object; and simulating a sound according to the invoked sound data, wherein the invoking sound data when the virtual object collides with the another virtual object comprises:

detecting, when the virtual object collides with the another virtual object, a collision speed perpendicular to a collision area generated when the virtual object collides with the another virtual object; and invoking predetermined collision sound data if the collision speed is greater than a predetermined minimum collision speed; and the simulating a sound according to the invoked sound data comprises: simulating a collision sound according to the invoked predetermined collision sound data;

wherein the invoking sound data when the virtual object collides with the another virtual object comprises:

detecting, when the virtual object collides with the another virtual object, the collision speed perpendicular to the collision area generated when the virtual object collides with the another virtual object and collision momentum generated when the virtual object collides with the another virtual object; and invoking predetermined dragging sound data if the collision speed is not greater than a predetermined collision speed, and the collision momentum is greater than predetermined minimum collision momentum; and the simulating a sound according to the invoked sound data comprises: simulating a dragging sound according to the invoked predetermined dragging sound data.

2. The method for simulating a sound in a virtual scenario according to claim 1, wherein the predetermined minimum collision speed corresponds to predetermined material information of the virtual object; and the invoking predetermined collision sound data if the collision speed is greater than a predetermined minimum collision speed comprises:

invoking the predetermined minimum collision speed corresponding to the predetermined material information of the virtual object; and determining, when the collision speed is greater than the predetermined minimum collision speed corresponding to the material information, collision sound data corresponding to the predetermined material information of the virtual object, and invoking the determined collision sound data.

3. The method for simulating a sound in a virtual scenario according to claim 1, wherein the predetermined minimum collision momentum corresponds to predetermined material information of the virtual object; and the invoking predetermined dragging sound data if the collision speed is not greater than a predetermined collision speed, and the collision momentum is greater than predetermined minimum collision momentum comprises:

invoking the predetermined collision speed, and the predetermined minimum collision momentum that corresponds to the predetermined material information of the virtual object; and determining, when the collision speed is not greater than the predetermined collision speed and the collision momentum is greater than the predetermined minimum collision momentum corresponding to the material information, dragging sound data corresponding to the predetermined material information of the virtual object, and invoking the determined dragging sound data.

4. A terminal, comprising:
one or more processors;
a memory; and
one or more program modules stored in the memory and configured for execution by the one or more processors, the one or more program modules located within an apparatus for simulating a sound in a virtual scenario, comprising:
a falling determining module, configured to determine whether a virtual object is in a falling state;
a collision detection module, configured to detect, when the virtual object is in the falling state, whether the virtual object collides with another virtual object in a virtual scenario; and
a sound simulation module, configured to invoke sound data when the virtual object collides with the another virtual object, and simulate a sound according to the invoked sound data,
wherein the sound simulation module comprises:
a first detection unit, configured to detect, when the virtual object collides with the another virtual object, a collision speed perpendicular to a collision area generated when the virtual object collides with the another virtual object;
a first sound data invoking unit, configured to invoke predetermined collision sound data when the collision speed is greater than a predetermined minimum collision speed; and
a first sound simulation unit, configured to simulate a collision sound according to the invoked predetermined collision sound data;
wherein the sound simulation module comprises:
a second detection unit, configured to detect, when the virtual object collides with the another virtual object, the collision speed perpendicular to the collision area generated when the virtual object collides with the another virtual object and collision momentum generated when the virtual object collides with the another virtual object;
a second sound data invoking unit, configured to invoke predetermined dragging sound data if the collision speed is not greater than a predetermined collision speed, and the collision momentum is greater than predetermined minimum collision momentum; and
a second sound simulation unit, configured to simulate a dragging sound according to the invoked predetermined dragging sound data.

5. The terminal according to claim 4, wherein the predetermined minimum collision speed corresponds to predetermined material information of the virtual object, and the first sound data invoking unit comprises:
a first invoking subunit, configured to invoke the predetermined minimum collision speed corresponding to the predetermined material information of the virtual object; and
a second invoking subunit, configured to determine, when the collision speed is greater than the predetermined minimum collision speed corresponding to the material information, collision sound data corresponding to the predetermined material information of the virtual object, and invoke the determined collision sound data.

6. The terminal according to claim 4, wherein the predetermined minimum collision momentum corresponds to predetermined material information of the virtual object, and the second sound data invoking unit comprises:
a third invoking subunit, configured to invoke the predetermined collision speed, and the predetermined minimum collision momentum that corresponds to the predetermined material information of the virtual object; and
a fourth invoking subunit, configured to determine, when the collision speed is not greater than the predetermined collision speed and the collision momentum is greater than the predetermined minimum collision momentum corresponding to the material information, dragging sound data corresponding to the predetermined material information of the virtual object, and invoke the determined dragging sound data.

7. A non-transitory computer readable storage medium having stored therein one or more instructions, which, when executed by a terminal, cause the terminal to:
determine whether a virtual object in a virtual scenario is in a falling state;
detect, when the virtual object is in the falling state, whether the virtual object collides with another virtual object in the virtual scenario;
invoke sound data when the virtual object collides with the another virtual object; and
simulate a sound according to the invoked sound data,
wherein the invoking sound data when the virtual object collides with the another virtual object comprises:
detecting, when the virtual object collides with the another virtual object, a collision speed perpendicular to a collision area generated when the virtual object collides with the another virtual object; and
invoking predetermined collision sound data if the collision speed is greater than a predetermined minimum collision speed; and
the simulating a sound according to the invoked sound data comprises: simulating a collision sound according to the invoked predetermined collision sound data;
wherein the invoking sound data when the virtual object collides with the another virtual object comprises:
detecting, when the virtual object collides with the another virtual object, the collision speed perpendicular to the collision area generated when the virtual object collides with the another virtual object and collision momentum generated when the virtual object collides with the another virtual object; and
invoking predetermined dragging sound data if the collision speed is not greater than a predetermined collision speed, and the collision momentum is greater than predetermined minimum collision momentum; and
the simulating a sound according to the invoked sound data comprises: simulating a dragging sound according to the invoked predetermined dragging sound data.

8. The computer readable storage medium according to claim 7, wherein the predetermined minimum collision speed corresponds to predetermined material information of the virtual object; and the invoking predetermined collision sound data if the collision speed is greater than a predetermined minimum collision speed comprises:

invoking the predetermined minimum collision speed corresponding to the predetermined material information of the virtual object; and determining, when the collision speed is greater than the predetermined minimum collision speed corresponding to the material information, collision sound data corresponding to the predetermined material information of the virtual object, and invoking the determined collision sound data.

9. The computer readable storage medium according to claim 7, wherein the predetermined minimum collision momentum corresponds to predetermined material information of the virtual object; and the invoking predetermined dragging sound data if the collision speed is not greater than a predetermined collision speed, and the collision momentum is greater than predetermined minimum collision momentum comprises:

invoking the predetermined collision speed, and the predetermined minimum collision momentum that corresponds to the predetermined material information of the virtual object; and determining, when the collision speed is not greater than the predetermined collision speed and the collision momentum is greater than the predetermined minimum collision momentum corresponding to the material information, dragging sound data corresponding to the predetermined material information of the virtual object, and invoking the determined dragging sound data.

* * * * *